United States Patent
Yun et al.

(10) Patent No.: US 10,307,988 B2
(45) Date of Patent: Jun. 4, 2019

(54) METHOD FOR MANUFACTURING HYBRID-NATURE LEATHER HAVING EXCELLENT APPEARANCE QUALITY AND DURABILITY

(71) Applicant: HYUNDAI MOTOR COMPANY, Seoul (KR)

(72) Inventors: Mi Jung Yun, Yongin-si (KR); Hye Min Lee, Seoul (KR); Gun Kang, Seoul (KR); Soon Joon Jung, Seoul (KR); Jang Won Lee, Seoul (KR); Hak Nam Lee, Gunpo-si (KR); Doo Yong Lee, Suwon-si (KR); Sang Hyun Kim, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 158 days.

(21) Appl. No.: 15/439,744

(22) Filed: Feb. 22, 2017

(65) Prior Publication Data
US 2018/0117877 A1    May 3, 2018

(30) Foreign Application Priority Data
Nov. 3, 2016    (KR) .................. 10-2016-0145866

(51) Int. Cl.
| | | |
|---|---|---|
| D06P 3/32 | (2006.01) |
| B32B 9/02 | (2006.01) |
| C14B 7/02 | (2006.01) |
| B32B 5/02 | (2006.01) |
| B32B 38/06 | (2006.01) |

(Continued)

(52) U.S. Cl.
CPC ............... *B32B 9/025* (2013.01); *B32B 5/02* (2013.01); *C14B 7/02* (2013.01); *D06P 3/32* (2013.01); *B32B 37/0076* (2013.01); *B32B 37/1292* (2013.01); *B32B 38/06* (2013.01);
(Continued)

(58) Field of Classification Search
None
See application file for complete search history.

(56) References Cited

U.S. PATENT DOCUMENTS

| | | | |
|---|---|---|---|
| 2011/0020590 A1* | 1/2011 | Yoneda .................... | C14B 7/02 428/91 |
| 2011/0078862 A1* | 4/2011 | Kashiwagura ....... | C09D 175/04 8/94.21 |

(Continued)

FOREIGN PATENT DOCUMENTS

| | | |
|---|---|---|
| JP | 6-8374 B2 | 2/1994 |
| KR | 20-0371907 Y1 | 1/2005 |

(Continued)

*Primary Examiner* — Barbara J Musser
(74) *Attorney, Agent, or Firm* — Knobbe Martens Olson & Bear LLP (57) ABSTRACT

A method for manufacturing hybrid-natural leather having excellent appearance quality and good durability such as light resistance, water resistance, elongation and abrasion resistance is provided. Particularly, the fiber layer having a similar structure to the natural leather is introduced to the natural leather and the natural leather and the fiber layer are bonded and fused with each other under a specific condition to manufacture hybrid-natural leather having excellent durability while preventing wrinkles, stretching, and the like from being generated.

12 Claims, 3 Drawing Sheets

(51) Int. Cl.
    *B32B 37/00*        (2006.01)
    *B32B 37/12*        (2006.01)
(52) U.S. Cl.
    CPC ....... *B32B 2255/00* (2013.01); *B32B 2317/08* (2013.01); *B32B 2367/00* (2013.01)

(56) References Cited

U.S. PATENT DOCUMENTS

| | | | | |
|---|---|---|---|---|
| 2011/0236637 A1* | 9/2011 | Kim | ......................... | B32B 7/12 428/151 |
| 2012/0184167 A1* | 7/2012 | Watkinson | ................ | B32B 5/26 442/189 |
| 2012/0315436 A1* | 12/2012 | Williams | ................ | B32B 5/022 428/141 |
| 2018/0104929 A1* | 4/2018 | Schoenfelder | ............ | B32B 5/02 |

FOREIGN PATENT DOCUMENTS

| | | |
|---|---|---|
| KR | 10-2007-0040139 A | 4/2007 |
| KR | 10-0853546 B1 | 8/2008 |
| KR | 10-2010-0060892 A | 6/2010 |

* cited by examiner

METHOD FOR MANUFACTURING HYBRID-NATURE LEATHER HAVING EXCELLENT APPEARANCE QUALITY AND DURABILITY

CROSS-REFERENCE TO RELATED APPLICATION

This application claims under 35 U.S.C. § 119(a) the benefit of Korean Patent Application No. 10-2016-0145866 filed on Nov. 3, 2016, the entire contents of which are incorporated herein by reference.

BACKGROUND (a) Field

The present disclosure relates to a method for manufacturing hybrid-natural leather having excellent appearance quality and good durability such as light resistance, water resistance, elongation and abrasion resistance.

(b) Background Art

Generally, the texture of leather sheet covers for a vehicle is softer than that of fabric sheet covers to provide comfortable ride to passengers. Further, recently, as the number of consumers who consider that structures and quality of the interior of the vehicle are important increase, the demand for natural leather sheet covers with luxurious feelings among the leather sheet covers has increased.

However, the natural leather sheet covers have wrinkles generated on the surface thereof by external pressure and impact applied when drivers or passengers are seated, which spoil the aesthetic beauty, and the generated wrinkles do not flatten out after use, and as a result, unique functionality of natural leather is not exhibited.

The natural leather is formed of animal collagen fiber, and overall physical characteristics are not uniform by growth characteristics, age, a difference between tissues for each region, and the like of the animal. In order to solve the problems, in the case of excluding regions with poor physical properties when manufacturing the natural leather sheet covers, the available regions are significantly reduced to cause an increase in production costs.

Some companies manufacturing the leather sheet covers for the vehicle improve these problems and provide solutions such as using a back region having a relatively excellent physical property among the regions of the natural leather at some parts including a seating portion of the leather sheet and the like to meet the needs of the consumers who prefer luxury automotive interior materials, but the solutions do not fundamentally improve the wrinkling problem.

Korean Utility Model Registration No. 20-0371907 provides a method of inserting a shape retention material with elasticity between leather sheets and Korean Patent Publication No. 10-2007-0040139 provides a method for sewing a material of a connection member sewed on the sheet cover by using an elastic material. However, the methods focus on only the solution of the structural problem of the automotive sheet, and thus are only applied to some configurations such as a connector and the like, and thus there is a problem in that the function is easily lost and there is a limitation in that the wrinkling problems of the natural leather are not fundamentally solved.

The disclosure of this section is to provide background of the invention. Applicant notes that this section may contain information available before this application. However, by providing this section, Applicant does not admit that any information contained in this section constitutes prior art.

SUMMARY

An aspect of the present invention is to provide hybrid-natural leather in which wrinkles, stretching, and the like are not generated by laminating and fusing fiber layers in the natural leather.

Another aspect of the present invention is to provide hybrid-natural leather having excellent appearance quality and excellent durability such as abrasion resistance and light resistance.

A further aspect of the present invention provides a method for manufacturing hybrid-natural leather, including: (1) a bonding step of forming a laminate of a leather layer and a fiber layer; and (2) a fusing step of integrating the leather layer and the fiber layer by coating a fusion composition on the fiber layer and then applying heat and pressure to the laminate.

In an embodiment, the leather layer may be natural leather and the fiber layer may be formed by polyethylene terephthalate (PET).

In another embodiment, a thickness of the fiber layer may be 0.01 mm to 0.2 mm.

In still another embodiment, before step (1), at least one of a tanning process, a dyeing process, and a branching process may be performed with respect to the leather layer.

In yet another embodiment, the method for manufacturing hybrid-natural leather may further include (3) a surface-treating step of forming sequentially a base painting layer, a color coating layer, and a top coating layer on the laminate after step (2).

In still yet another embodiment, the base painting layer may be formed by a method of coating a base paint composition comprising 14 wt % to 20 wt % of a filler, 7 wt % to 13 wt % of an acrylic resin, and 60 wt % to 80 wt % of polyurethane on the laminate.

In a further embodiment, the color coating layer may be formed by a method of coating a color coating composition comprising 13 wt % to 19 wt % of a filler, 7 wt % to 13 wt % of an acrylic resin, and 62 wt % to 72 wt % of polyurethane on the base painting layer.

In another further embodiment, the top coating layer may be formed by a method of coating a top coating composition comprising 8 wt % to 10 wt % of matt polyurethane, 40 wt % to 60 wt % of polyurethane, 5 wt % to 9 wt % of water-soluble silicon, 8 wt % to 12 wt % of an acrylic resin, 5 wt % to 9 wt % of a cross linker, and 2 wt % to 4 wt % of a sunscreen agent on the color coating layer.

In still another further embodiment, in step (3), the embossing for the laminate may be performed before forming the color coating layer after forming the base painting layer.

In yet another further embodiment, the embossing may be performed at a temperature of 150° C. to 170° C. and pressure of 150 kg/cm² to 170 kg/cm².

In still yet another further embodiment, step (1) may be a step of forming the laminate by applying a curable composition between the leather layer and the fiber layer by a dot method.

In a still further embodiment, the curable composition may be transferred to the leather layer or the fiber layer.

In a yet still further embodiment, step (2) may include coating a fusion composition including 75 wt % to 95 wt % of a filler, 7 wt % to 13 wt % of an acrylic resin binder, and 3 wt % to 7 wt % of a urethane binder, and applying a temperature of 100° C. to 120° C. and pressure of 100 kg/cm² to 120 kg/cm².

In the hybrid-natural leather manufactured according to embodiments of the present invention, a fiber layer with a small thickness and a similar structure to natural leather is fused with the natural leather to maintain a texture of the natural leather as it is and prevent wrinkles, stretching, and the like from being generated.

In the hybrid-natural leather manufactured according to embodiments of the present invention, the fiber layer is not simply attached, but fused with the natural leather to have excellent adhesion and thus have excellent durability such as abrasion resistance and light resistance while having excellent appearance (wrinkles and stretching) quality.

The hybrid-natural leather manufactured according to embodiments of the present invention may be used to be suitable for automotive interiors, particularly sheet covers by the above effect.

The effects of the present invention are not limited to the aforementioned effects. It should be understood that the effects of the present invention include all effects inferable from the description below.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to embodiments thereof illustrated in the accompanying drawings which are given hereinbelow by way of illustration only, and thus are not limitative of the present invention, and wherein.

Reference numerals set forth in the Drawings includes reference to the following elements as further discussed below:

| 10: leather layer | 20: fiber layer |
|---|---|
| 30: Curable composition | 40: fusion composition |
| S10: preparing | S20: bonding |
| S30: fusing | S40: surface-treating |

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts in embodiments of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with embodiments, it will be understood that present description is not intended to limit the invention to those embodiments. On the contrary, the invention is intended to cover not only the embodiments, but also various alternatives, modifications, equivalents and other embodiments, which may be included within the spirit and scope of the invention as defined by the appended claims.

Hereinafter, the present invention will be described in more detail through embodiments. The embodiments of the present invention may be modified in various forms as long as the gist of the invention is not changed. However, the scope of the present invention is not limited to the following embodiments.

When it is determined that the present invention may obscure the gist of the present invention, the description for the known configurations and functions will be omitted. In this specification, the term "comprise" means that other constituent elements may be further included unless otherwise listed.

Figure 1:
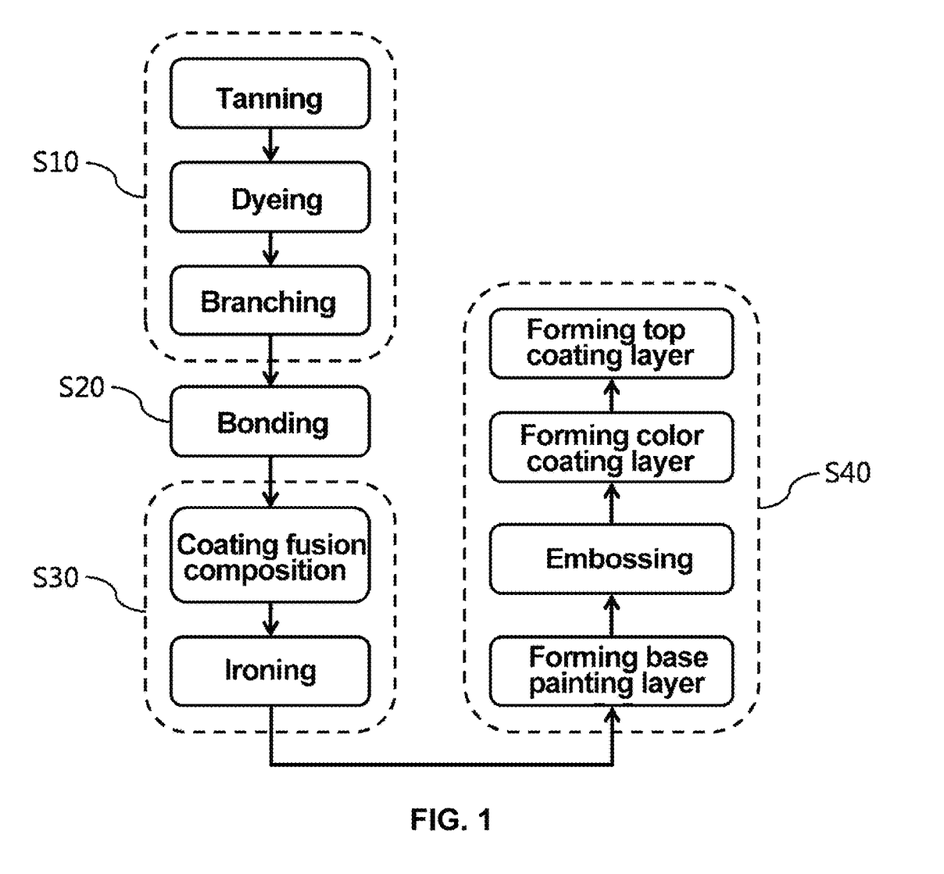
FIG. 1 is a flowchart for a method for manufacturing hybrid-natural leather having excellent appearance quality and durability according to embodiments of the present invention.

FIG. 1 is a flowchart for a method for manufacturing hybrid-natural leather having excellent appearance quality and durability according to embodiments of the present invention. Referring to FIG. 1, the method for manufacturing the hybrid-natural leather includes preparing (S10), bonding (S20), fusing (S30), and surface-treating (S40).

The preparing (S10) may include a tanning process, a dyeing process, and a branching process, as a step of processing natural leather before bonding and fusing the natural leather with a fiber layer. However, the preparing is not limited to the above processes and may further include a soaking process, a liming process, a freshing process, and the like.

The bonding (S20) as a step of forming a laminate of a leather layer and a fiber layer processed by the preparing may be performed by a method of applying a curable composition between the leather layer and the fiber layer by a dot method. The detailed content for the dot method will be described below.

The fusing (S30) may include a process of coating a fusion composition including a filler, a binder, and the like on the laminate of the leather layer and the fiber layer and an ironing process of applying heat and pressure to the laminate coated with the fusion composition.

The leather layer (the natural leather) and the fiber layer are integrated by the bonding and the fusing to prevent wrinkles, stretching, and the like from being generated. The hybrid-natural leather having the excellent appearance quality may be obtained.

The leather layer and the fiber layer are not simply attached, but attached and fused and thus the adhesion between the two configurations is excellent. Accordingly, in the hybrid-natural leather, even though the fiber layer is inserted, durability such as light resistance and abrasion resistance does not deteriorate.

The surface-treating (S40) is a finishing step of forming sequentially a base painting layer, a color coating layer, and a top coating layer on the top of the fiber layer and may further include an embossing process for the laminate after forming the base painting layer.

Hereinafter, each step will be described in detail.

1) Preparing (S10)

The preparing is a step of processing the leather layer before performing the bonding and the fusing. In embodiments of the present invention, natural leather may be used as the leather layer. However, in implementing embodiments of the present invention, the leather layer may use leather materials such as artificial leather, recycled leather, synthetic leather, vinyl, and the like for the purpose.

a) Tanning Process

The tanning process is a process in which the leather layer has a stabilized fiber structure and may be divided into deliming, bating, pickling, tanning, and fixing processes.

The deliming process is a process of neutralizing and eluting the lime which is bonded to the leather layer by soaking the leather layer in a solution of acid or ammonium salt.

The bating process is a process of removing unnecessary proteins other than collagen by adding protease in the solution containing the leather layer.

The pickling process is a process of depositing the leather layer in an acid in order to obtain pH suitable for the tanning process.

The tanning process is a process of changing collagen proteins having an unstable structure included in the leather layer into proteins having a stable structure by binding to a tanning material such as chromium oxide and phosphorus. Accordingly, physical properties such as heat resistance, spoilage resistance, chemical resistance, and flexibility of the leather layer are improved.

The fixing process is a process of enhancing physical strength of the leather layer by fixing the leather layer for about 1 to 2 days through the tanning process.

b) Dyeing Process

The dyeing process is a process of uniformly coloring a dye on the leather layer to exhibit various colors by applying physical manipulations such as stirring and mixing after the leather layer through the tanning process is immersed in the dye contained in a thermostatic bath.

The dyeing process may be performed by adjusting duration, the number of times, and the like of the dyeing process according to a shape, a usage, and the like of the leather layer.

c) Branching process The branching process is a process of restoring flexibility of the leather layer which is hardened through the dyeing process. The branching process may be performed by a method of reducing friction between fibrous structures by applying animal or mineral oil to the leather layer to penetrate the oil between the fibrous structures of the leather layer.

2) Bonding (S20)

The bonding is a process of forming the laminate of the leather layer and the fiber layer processed by the preparing.

The fiber layer may be formed of a similar material to the fibrous structure of the leather layer as the natural leather. The bonding is to maximize sensitivity and tactility of the leather.

Accordingly, the fiber layer may be formed of a polyethylene terephthalate (PET) fibrous material.

Further, the fiber layer may have a thickness of 0.01 mm to 0.2 mm. When the thickness exceeds 0.2 mm, the fibrous structure of the fiber layer is visible from the outside and thus the appearance quality may deteriorate, and when the thickness is less than 0.01 mm, an effect of preventing wrinkles and stretching may be small.

As such, in embodiments of the present invention, since the fiber layer is formed with an appropriate thickness by using a material having a similar structure to the leather layer, the appearance quality thereof may be improved while a unique texture of the leather layer is maintained as it is when the leather layer is fused.

Figure 2:
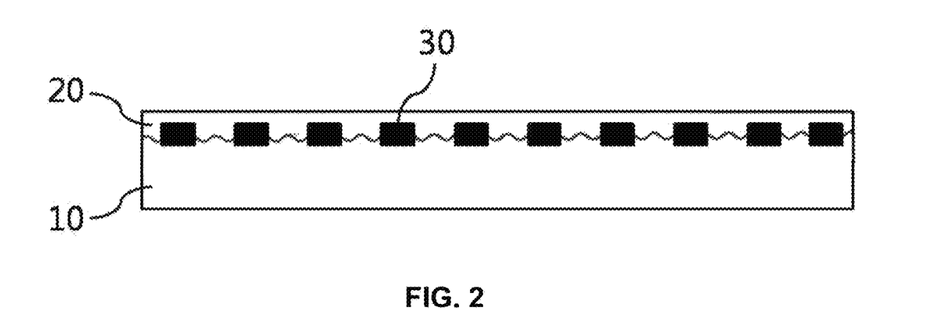
FIG. 2 is a reference diagram for describing a bonding step of the method for manufacturing the hybrid-natural leather according to embodiments of the present invention.

In the bonding, the method of forming the laminate of the leather layer and the fiber layer may follow a general bonding method, but preferably, may be performed by a laminating method by applying heat and pressure after printing a curable composition 30 between the leather layer 10 and the fiber layer 20 by a dot method.

In embodiments of the present invention, the applying of the curable composition by a 'dot method' is not applying the curable composition to the entire area of an interface between the leather layer and the fiber layer, but is applied to only the predetermined portion, and is applied by inserting the dots as illustrated in FIG. 2. To this end, the curable composition may be applied to the interface between the leather layer and the fiber layer by a transfer (transition) method. Particularly, the applying of the curable composition may be performed by using hot melt laminating equipment.

The curable composition may use a 1-liquid type magnetic curable (moisture curable) composition, but may use a water-soluble adhesive and the like.

3) Fusing (S30)

Figure 3A:
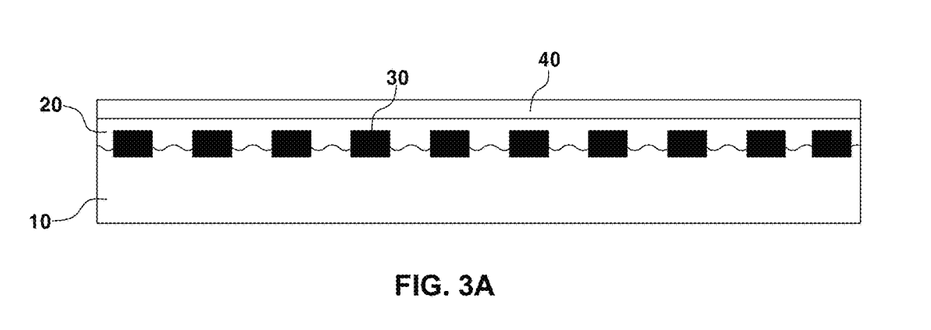
FIGS. 3A and 3B are reference diagrams for describing a fusing step of the method for manufacturing the hybrid-natural leather according to embodiments of the present invention.

The fusing is a process of coating a fusion composition on the laminate of the leather layer and the fiber layer and then performing an ironing process for the laminate to fuse the fiber layer with the leather layer.

a) Coating process of fusion composition The fusing, as illustrated in FIG. 3A, may start by a process of coating a fusion composition 40 including a filler, a binder, and the like on the fiber layer 20.

Figure 3B:
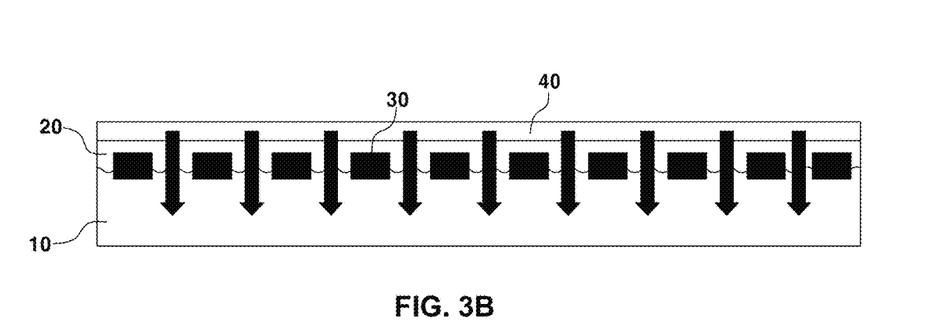

Subsequently, as illustrated in FIG. 3B, the fusion composition 40 is penetrated to the leather layer 10 through the fiber layer 20 and the fiber layer 20 is fused with the leather layer 10 when applying heat and pressure through the ironing process to be described below.

The fusion composition may include 75 wt % to 95 wt % of a filler, 7 wt % to 13 wt % of an acrylic resin binder, and 3 wt % to 7 wt % of a urethane binder.

As the filler, silica, an aqueous polymer, and the like may be used.

When the content of the filler is generally less than 75 wt % (not absolute), the fibrous structure of the fiber layer is exposed to the outside and thus the appearance quality may deteriorate, and when the content thereof is generally more than 95 wt % (not absolute), the fusion composition may not penetrate the fiber layer and the leather layer.

The acrylic resin binder includes an acrylic resin and a solvent to satisfy a condition of pH 8.

When the content of the acrylic resin binder is generally less than 7 wt % (not absolute), the fusion composition may not penetrate the fiber layer and the leather layer and when the content thereof is generally more than 13 wt % (not absolute), the viscosity of the fusion composition is reduced and may not maintain a form of a painting film.

As the urethane binder, aliphatic polyurethane with a pH of 8.5 may be used.

When the content of the urethane binder is adjusted to generally 3 wt % to 7 wt %, the flexibility may be imparted to the fiber layer.

The fusion composition may be coated on the fiber layer with a loading amount of 4 g/sf to 6 g/sf. When the fusion composition is coated with generally less than 4 g/sf (not absolute), the penetration amount of the fiber layer and the leather layer is small and the two configurations may not be fused, and when the fusion composition is coated with generally more than 6 g/sf (not absolute), it is difficult to form the painting film with the fusion composition.

b) Ironing Process

The ironing process of applying heat and pressure to the laminate after coating the fusion composition is performed to fuse the fiber layer with the leather layer.

Accordingly, as described above, the leather layer and the fiber layer are integrated to prevent wrinkles, stretching, and the like from being generated. Thus, the hybrid-natural leather having the excellent appearance quality may be obtained.

Further, the leather layer and the fiber layer are not simply attached, but attached and fused and thus the adhesion between the two configurations is excellent. Accordingly, durability such as light resistance and abrasion resistance of the hybrid-natural leather may not deteriorate.

The ironing process may be performed by a method of roll-embossing the laminate.

The ironing process may be performed under conditions of a temperature of 100° C. to 120° C. and pressure of 100 kg/cm$^2$ to 120 kg/cm$^2$.

When the temperature of the ironing process is generally less than 100° C. (not absolute), smoothing of the painting film formed of the fusion composition may deteriorate and the fusion composition is not evenly penetrated and thus leveling may deteriorate. Meanwhile, when the temperature is generally more than 120° C. (not absolute), the fusion composition is boiled by the too high temperature and thus the quality of the laminate may deteriorate.

When the pressure of the ironing process is generally less than 100 kg/cm$^2$ (not absolute), the smoothing of the painting film formed of the fusion composition may deteriorate and when the pressure is generally more than 120 kg/cm$^2$ (not absolute), the fusion composition is boiled by the too high pressure and thus the quality of the laminate may deteriorate.

When the ironing process is performed by a continuous process, the ironing process may be performed with a moving velocity of 7 m/min to 9 m/min under the above temperature and pressure condition.

Figure 4:
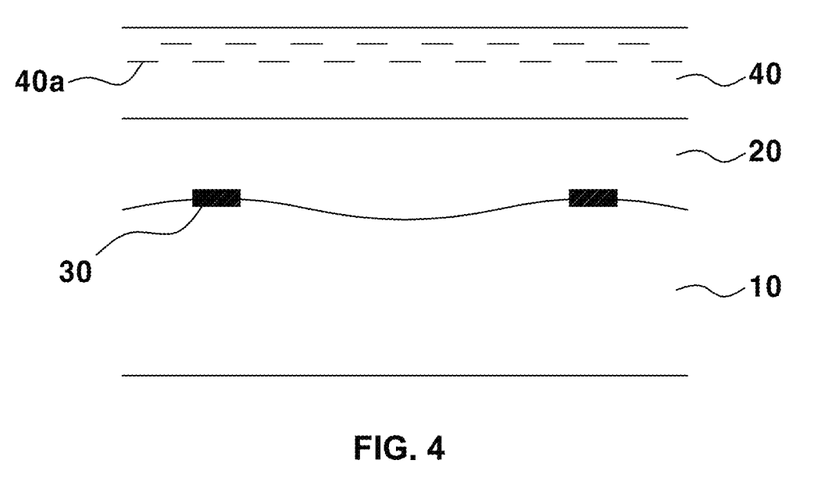
FIG. 4 is an enlarged sectional view showing layers including applied curable composition layer over the fiber layer.
Figure 5:
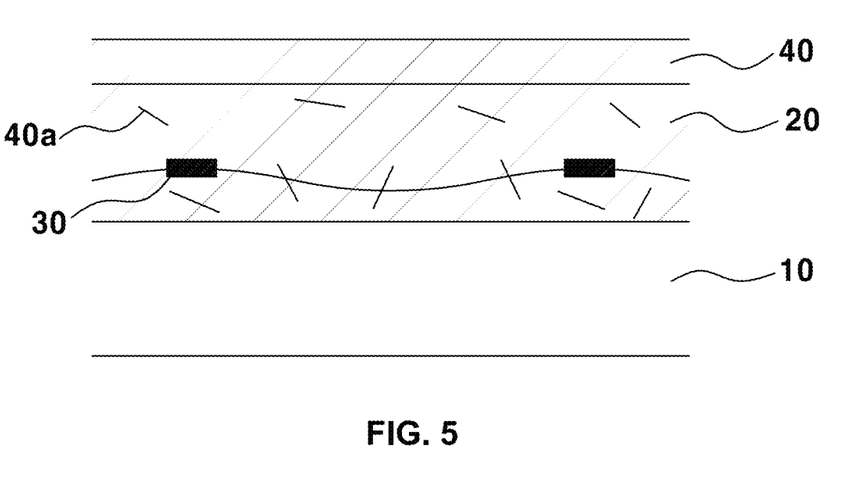
FIG. 5 is an enlarged section view showing the structure of a completed product of the hybrid-natural leather according to one embodiment.

In embodiments, referring to FIG. 4, the curable composition or fusion composition is applied over the fiber layer 20 to form a curable composition layer 40. The fiber layer 20 is temporarily attached to the natural leather layer 10 using the adhesive composition dots 30. The curable composition 40 includes filler particles 40a and at least one resin. Referring to FIGS. 4 and 5, in embodiments, when pressing with heat the curable composition layer, both the filler particles 40a and the resin permeate into the fiber layer 20 and an upper portion of the leather layer 10 such that a substantial portion of the filler particles 40a and the resin are present in the fiber layer 20 and the upper portion of the leather layer 10. In embodiments, the fiber layer 20 is either a non-fabric sheet or a fabric sheet.

In embodiment, the curable composition of the curable composition layer 40 is cured without boiling. For this, the temperature of a roller for applying pressure and heat to the curable composition layer 40 is controlled not to boil the curable composition. In embodiments, once the resin is completely cured, the leather layer 10, the fiber layer 20 and the cured composition layer 40 are integrated as shown in FIG. 5.

4) Surface-Treating (S40)

The surface-treating is a finishing process for the laminate through the bonding and the fusing and may be performed by sequentially performing a base painting layer forming process, an embossing process, a color coating layer forming process, and a top coating layer forming process.

a) Base Painting Layer Forming Process

The base painting layer forming process is a process for the surface planarization by covering a kind of painting film on the rough surface of the laminate.

The base painting layer may be formed by a method of coating a base paint composition comprising 14 wt % to 20 wt % of a filler, 7 wt % to 13 wt % of an acrylic resin, and 60 wt % to 80 wt % of polyurethane on the laminate.

The base painting layer may be coated with a loading amount of 12 g/sf to 14 g/sf.

b) Embossing Process

The embossing process is a process of forming a pattern on the hybrid-natural leather by using a mold pressing plate. Preferably, the embossing process may be performed under conditions of a temperature of 150° C. to 170° C. and pressure of 150 kg/cm$^2$ to 170 kg/cm$^2$.

c) Color Coating Layer Forming Process

The color coating layer forming process is a process of applying a final color to the hybrid-natural leather.

The color coating layer may be formed by coating a color coating composition comprising 12 wt % of a filler, 18 wt % of an acrylic resin, 47 wt % of polyurethane, 5 wt % of silicon, 3 wt % of a leveler, and 15 wt % of a pigment by a spray injection method.

The color coating layer may be coated with a loading amount of 2.5 g/sf to 3 g/sf.

d) Top Coating Layer Forming Process

The top coating layer forming process is a process of forming a final coating film (layer) which protects the surface of the hybrid-natural leather.

The top coating layer may be formed by coating a top coating composition comprising 8 wt % to 10 wt % of matt polyurethane, 40 wt % to 60 wt % of polyurethane, 5 wt % to 9 wt % of water-soluble silicon, 8 wt % to 12 wt % of an acrylic resin, 5 wt % to 9 wt % of a cross linker, and 2 wt % to 4 wt % of an sunscreen agent by a spray injection method.

The cross linker may mean a composition in which polyisocyanate is dissolved in a polar organic solvent.

The top coating layer may be coated with a loading amount of 2 g/sf to 2.5 g/sf.

Hereinafter, the present invention will be described in more detail through Examples of the present invention. However, the present invention is not limited to the following Examples.

EXAMPLES

The following examples illustrate the invention and are not intended to limit the same.

Example 1

A leather layer and a fiber layer through tanning, dyeing, and branching processes were prepared. As the leather layer, steer leather as natural leather was used, and as the fiber layer, polyethylene terephthalate (PET) as a polyester material was used. The fiber layer was prepared with a thickness of 0.2 mm.

A laminate was formed by printing a curable composition between the leather layer and the fiber layer by a dot method and then applying heat and pressure.

Particularly, a curable composition was transferred (transited) to the leather layer and the fiber layer. Thereafter, an ironing process was performed at a temperature of 100° C. and pressure of 100 kg/cm$^2$ to apply heat and pressure.

A fusion composition including 80 wt % of a filler, 10 wt % of an acrylic resin binder, and 10 wt % of a urethane binder was coated on the fiber layer with a loading amount of 6 g/sf. AQUABASE RN-03 (Melio, solid content of about 32%, pH 9) as the filler, RESIN A-712 (3M UNITEK SONDHI INDIRECT BONDING ADHESIVE, solid content of about 19.5, pH 8) as the acrylic resin binder, and PROMUL 53.A (Melio, solid content of about 20%, pH 8.5) as the urethane binder were used.

Thereafter, the fiber layer may be fused with the leather layer by performing the ironing process by a roll embossing method under conditions of a temperature of 120° C. and pressure of 100 kg/cm$^2$ and applying heat and pressure to the laminate.

As a part of surface-treating the laminate, processes of forming a base painting layer, embossing, forming a color coating layer, and forming a top coating layer were performed. The detailed methods are as follows.

The base painting layer was formed by coating a base paint composition including a filler, an acrylic resin, and polyurethane on the laminate.

The embossing was performed by using a press plate having a predetermined shape under conditions of a temperature of 170° C. and pressure of 170 kg/cm$^2$.

The color coating layer was formed by injecting a color coating composition comprising 12 wt % of a filler, 18 wt % of an acrylic resin, 47 wt % of polyurethane, 5 wt % of silicon, 3 wt % of a leveler, and 15 wt % of a pigment by a sprayer.

The top coating layer was formed by injecting a top coating composition comprising 10 wt % of water, 10 wt % of matt polyurethane, 50 wt % of polyurethane, 9 wt % of water-soluble silicon, 10 wt % of an acrylic resin, 3 wt % of a leveler, 7 wt % of a cross linker, and 1 wt % of a sunscreen agent by a sprayer.

Finally, the hybrid-natural leather according to embodiments of the present invention was obtained by the above processes.

Example 2 to Example 5

The hybrid-natural leather was manufactured by the same composition and method as Example 1 and a condition disclosed in Table 1 below was varied.

Comparative Example 1 to Comparative Example 6

In Comparative Example 1, steer leather as natural leather was used, and in Comparative Example 2, hybrid-natural leather, in which a laminate through only bonding of Example 1 was surface-treated, was used.

In Comparative Examples 3 to 6, the hybrid-natural leather was manufactured by the same composition and method as Example 1 and a condition disclosed in Table 1 below varied.

TABLE 1

| Classification | Fusion composition (wt %) | | Ironing pressure of fusing step [kg/cm$^2$] | Thickness of fiber layer [mm] | Embossing method |
| --- | --- | --- | --- | --- | --- |
| | Filler | Acrylic resin binder | | | |
| Example 1 | 80 | 10 | 100 | 0.2 | Heat + Pressure |
| Example 2 | 90 | 10 | 120 | 0.1 | Heat + Pressure |
| Example 3 | 80 | 8 | 120 | 0.1 | Heat + Pressure |
| Example 4 | 75 | 7 | 100 | 0.1 | Heat + Pressure |
| Example 5 | 95 | 7 | 100 | 0.1 | Heat + Pressure |
| Comparative Example 1 | — | — | — | — | Pressure |
| Comparative Example 2 | — | — | — | 0.3 | Pressure |
| Comparative Example 3 | 70 | 10 | 110 | 0.2 | Pressure |
| Comparative Example 4 | 80 | 5 | 100 | 0.2 | Pressure |
| Comparative Example 5 | 100 | 15 | 120 | 0.1 | Heat + Pressure |
| Comparative Example 6 | 80 | 8 | 130 | 0.1 | Heat + Pressure |

Test Examples

With respect to the Examples 1 to 5 and Comparative Examples 1 to 6, appearance, light resistance, water resistance, static load elongation, and abrasion resistance were evaluated by the following method.

Evaluation of appearance—The appearance was evaluated based on whether wrinkles and defects shown by the structure of the fiber layer were exposed to the outside.

Evaluation of light resistance—The light resistance was evaluated based on whether a dichromatic feeling of leather colors occurred when a light amount of 82MJ (168HR) was applied.

Water resistance—The water resistance was evaluated based on whether swelling of the appearance and peeling of the paint were present after being left for 7 days in a state of water of 95% or more.

Static load elongation—The static load elongation was evaluated by using a fatigue tester (Maidens fatigue tester) according to a test method of MS 300-31.

Abrasion resistance—The abrasion resistance was evaluated based on a time when the surface painting was peeled during abrasion of 2,000 times or more with a friction abrasion wheel of 1 KG load.

The result is illustrated in Table 2 below.

TABLE 2

| Classification | Appearance | Light resistance | Water resistance | Static load elongation [%] | Abrasion resistance [number of times] |
|---|---|---|---|---|---|
| Example 1 | Good | Good (grade 3) | Good | 15~20 | 2000 |
| Example 2 | Good | Good (grade 3) | Good | 15~20 | 2500 |
| Example 3 | Good | Good (grade 3) | Good | 15~20 | 2000 |
| Example 4 | Good | Good (grade 3) | Good | 15~20 | 2000 |
| Example 5 | Good | Good (grade 3) | Good | 15~20 | 2000 |
| Comparative Example 1 | Good | Good (grade 3) | Good | 30~50 | 2000 |
| Comparative Example 2 | N.G Exposure of fiber structures | Good (grade 3) | N.G | 10~15 | 500 |
| Comparative Example 3 | Good | Good (grade 3) | N.G | 10~15 | 1000 |
| Comparative Example 4 | Good | Good (grade 3) | N.G | 10~15 | 1200 |
| Comparative Example 5 | N.G Fusion composition No formation of painting layer | N.G (grade 4) | N.G | 15~20 | 500 |
| Comparative Example 6 | Good | N.G (grade 4) | Good | 15~20 | 500 |

Referring to the result of Comparative Example 2, it can be confirmed that because of hybrid-natural leather without the fusing process, appearance quality is not good and durability such as water resistance, static load elongation, and abrasion resistance also deteriorates.

Referring to the result of Comparative Example 5, it can be confirmed that when the content of the filler and the acrylic resin binder of the fusion composition is too large, the fusion composition is not penetrated well, and accordingly, since the laminate is not fused, an appearance, light resistance, water resistance, and abrasion resistance significantly deteriorate.

Therefore, like Examples 1 to 5, it can be confirmed that since the leather layer and the fiber layer may be most ideally fused when a fiber layer thickness is 0.2 mm or less, a content of filler is 75 wt % to 95 wt %, and the content of an acrylic resin binder is 7 wt % to 13 wt %, the appearance quality is excellent because the structure of the fiber layer is not exposed to the outside and the static load elongation is high because the leather is not stretched, and abrasion resistance is excellent.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing hybrid-natural leather, comprising:
   a bonding step of forming a laminate of a leather layer and a fiber layer; and
   a fusing step of integrating the leather layer and the fiber layer by coating a fusion composition on the fiber layer and then applying heat and pressure to the laminate, wherein the fusing step includes:
   coating the fusion composition including 75 wt % to 95 wt % of a filler, 7 wt % to 13 wt % of an acrylic resin binder, and 3 wt % to 7 wt % of an urethane binder, and
   applying a temperature of 100° C. to 120° C. and pressure of 100 kg/cm$^2$ to 120 kg/cm$^2$.

2. The method of manufacturing hybrid-natural leather of claim 1, wherein the leather layer is natural leather, and the fiber layer is formed by polyethylene terephthalate (PET).

3. The method of manufacturing hybrid-natural leather of claim 1, wherein a thickness of the fiber layer is 0.01 mm to 0.2 mm.

4. The method of manufacturing hybrid-natural leather of claim 1, wherein before the bonding step, at least one of a tanning process, a dyeing process, and a branching process is performed with respect to the leather layer.

5. The method of manufacturing hybrid-natural leather of claim 1, further comprising:
   after the fusing step, a surface-treating step of forming sequentially a base painting layer, a color coating layer, and a top coating layer on the laminate.

6. The method of manufacturing hybrid-natural leather of claim 5, wherein the base painting layer is formed by a method of coating a base paint composition comprising 14 wt % to 20 wt % of a filler, 7 wt % to 13 wt % of an acrylic resin, and 60 wt % to 80 wt % of polyurethane on the laminate.

7. The method of manufacturing hybrid-natural leather of claim 5, wherein the color coating layer is formed by a method of coating a color coating composition comprising 13 wt % to 19 wt % of a filler, 7 wt % to 13 wt % of an acrylic resin, and 62 wt % to 72 wt % of polyurethane on the base painting layer.

8. The method of manufacturing hybrid-natural leather of claim 5, wherein the top coating layer is formed by a method of coating a top coating composition comprising 8 wt % to 10 wt % of matt polyurethane, 40 wt % to 60 wt % of polyurethane, 5 wt % to 9 wt % of water-soluble silicon, 8 wt % to 12 wt % of an acrylic resin, 5 wt % to 9 wt % of a cross linker, and 2 wt % to 4 wt % of a sunscreen agent on the color coating layer.

9. The method of manufacturing hybrid-natural leather of claim 5, wherein in the surface-treating step, embossing for the laminate is performed before forming the color coating layer after forming the base painting layer.

10. The method of manufacturing hybrid-natural leather of claim 9, wherein the embossing is performed at a temperature of 150° C. to 170° C. and pressure of 150 kg/cm$^2$ to 170 kg/cm$^2$.

11. The method of manufacturing hybrid-natural leather of claim 1, wherein the bonding step comprises a step of forming the laminate by applying a curable composition between the leather layer and the fiber layer by a dot method.

12. The method of manufacturing hybrid-natural leather of claim 11, wherein the curable composition is transferred to the leather layer or the fiber layer.

* * * * *